United States Patent
Van Splunter et al.

(10) Patent No.: US 6,252,585 B1
(45) Date of Patent: Jun. 26, 2001

(54) IMAGE DISPLAY SYSTEM

(75) Inventors: Marinus Van Splunter; Evert J. D. Pol, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/281,394

(22) Filed: Mar. 30, 1999

(30) Foreign Application Priority Data

Apr. 2, 1998 (EP) .................................................. 98201054

(51) Int. Cl.[7] .................................................. G09G 5/04
(52) U.S. Cl. .......................... 345/199; 153/150; 153/186
(58) Field of Search .................................. 345/431, 432, 345/153, 154, 199, 112, 117, 150, 155, 506, 507, 186; 348/384.1, 390.1, 391.1, 396.1, 714, 715; 375/240, 240.01; 382/162, 166; G09G 5/04

(56) References Cited

U.S. PATENT DOCUMENTS

| | | | |
|---|---|---|---|
| 5,227,863 | * 7/1993 | Bilbrey | 345/328 |
| 5,611,030 | * 3/1997 | Strokes | 345/431 |
| 5,940,067 | * 8/1999 | Greene | 345/431 |
| 5,943,058 | * 8/1999 | Nagy | 345/431 |
| 6,043,804 | * 3/2000 | Greene | 345/153 |

\* cited by examiner

*Primary Examiner*—Matthew Luu
*Assistant Examiner*—Wessner Sajous
(74) *Attorney, Agent, or Firm*—Russell Gross

(57) ABSTRACT

An index determination element selects index values as a function of the source color values. The index values pointing to LUT color values stored in a lookup table unit. The LUT color values read from the lookup table unit are used to generate output color values. Each output color value corresponds to a pixel, a first component of the output color values is output for at least two pixels at a time and second components are output separately for each of these at least two pixels. As a result there is a space of combinations of index values that results in substantially the same first component of the output values, even though they points to substantially different LUT color values for these at least two pixels. The index determination element selects a combination from this space to minimize an error in the second components of the output color values for the at least two pixels.

10 Claims, 1 Drawing Sheet

IMAGE DISPLAY SYSTEM

BACKGROUND OF THE INVENTION

1. Field of the Invention

The invention relates to an image display system, and device and method for using this system.

2. Description of the Related Art

In image display systems, it is desirable to reduce the amount of information that is needed to represent images. One technique to achieve this is the use of a color look-up table (CLUT) which is used particularly in systems that generate computer graphics images. In this case, one represents the color value of each pixel in an image by an index value that points to a color value stored in the CLUT. When a color value is needed, the index value is used to retrieve the color value from the CLUT.

The palette of colors that is available in the CLUT is preferably much smaller than the total number of conceivable color values. Thus, the amount of information needed to represent an index value is smaller than the amount of information that is needed to represent an arbitrary color value.

Of course, the price of this is that the representation by index values of an arbitrary original image is only approximate: there will be differences between the color values of the original image and the representation. When such a representation is used to display the arbitrary image, the differences will show up as high frequency noise. In addition, there may be systematic color errors (low frequency noise), but these can be eliminated by dithering techniques.

In some display systems, in particular, in video or television display systems, colors for display are represented by YUV values, that is, a luminance component Y and color difference components UV, as standardized by the CCIR. When YUV values are used, a higher spatial resolution is preferably used for the Y component than for the UV components. Typically, separate Y values are used for different pixels, whereas the UV components are the same for pairs of adjacent pixels.

The YUV components corresponding to different colors may be stored in a CLUT, but of course this is merely a matter of representation; it does not affect the noise caused by using a CLUT.

SUMMARY OF THE INVENTION

It is an object of the invention to reduce the amount of visible noise.

The display system according to one aspect of the invention is, comprises a cascade of an image source, an index determination element, a lookup table unit and an output unit, successively, the image source producing source color values, the index determination element selecting index values as a function of the source color values, the index values pointing to LUT color values stored in the lookup table unit, the output unit deriving output color values from LUT color values read from the lookup table unit under selection from the index values, each output color value corresponding to a pixel, a first component of the output color values being output in common for at least two pixels and a second component being output separately for each of these at least two pixels, so that there is a space of possible combinations of index values for these at least two pixels which combinations all result in substantially the same first component of the output color value, the index values in at least one combination from this space pointing to substantially different LUT color values, wherein the index determination element uses selection from this space to minimize an error in the second component of the output color values for the at least two pixels. The idea behind this aspect of the invention is that one makes use of the knowledge that a first component of the color values, such as the U or V component, is output at a lower spatial resolution than a second component of the color values, such as the Y component. Hence, without causing larger noise, one can select index values without minimizing the errors in the first component (e.g., U or V) at the higher resolution, as long as the error in the actual component that is output at the lower resolution is substantially minimized (substantially meaning, for example that the error is less than a factor of say 2 times the minimum possible error). According to this aspect of the invention, the additional selection freedom is used to get a closer approximation of the second component (e.g., Y). This is done by selecting an index value that minimizes the errors in the second component among a larger space of possible index values.

In an embodiment of the display system of the invention, the color values in the CLUT contain a Y field, a U field and a V field, used to control the color components on a displayed image according to the YUV standard, the first component being the U and/or V component and the second component being the Y component.

In a further embodiment of the display system according to the invention, the U and/or V component of the LUT color value for only every second pixel is output. In this case, the index values for the other pixels, for which neither the U nor the V component is output, are selected to minimize the error in the Y component, for example, by ensuring that the average of the Y components of each pair of a "second" pixel and an "other" pixel matches the Y component of the corresponding source color value or values. Thus, the space of index values is always the same and it is possible to select from the set of combinations of index values by lookup from a table instead of a more time-consuming search.

In a further embodiment of the display system of the invention, the index values are determined from color values that contain RGB fields. Thus, a conventional graphics image source may be used.

In another embodiment of the invention, the transfer unit ignores the first component of every second pixel and the index value for the second pixels being determined as a function of the second component of the pixel values only. In this way, little computational overhead is needed to determine the index values.

BRIEF DESCRIPTION OF THE DRAWING

These and other advantageous aspect of the invention will be described by way of a non-limiting example using the accompanying drawing, in which.

DESCRIPTION OF THE PREFERRED EMBODIMENTS

Figure 1:
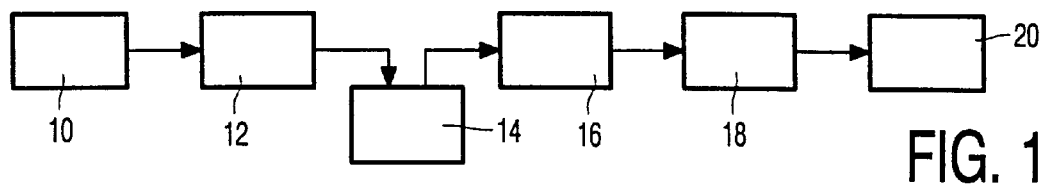
FIG. 1 shows an image display system.

FIG. 1 shows an image display system. The image display system contains a cascade of an image source 10, a CLUT index determination unit 12, a frame buffer 14, a CLUT unit 16, an output unit 18 and a display unit 20.

In operation, the image display system functions to generate an image made up of pixels. The image source 10 produces source color values which represent the image. Each source color value describes the properties of the light associated with a respective pixel. The source color values are made up, for example, of three 8 bit color component fields (R, G and B, respectively). The CLUT index determination unit 12 determines index values from the source color values, the index values containing, for example, 8 bits each. The index values are stored in the frame buffer 14 and later retrieved and sent to the CLUT unit 16.

The CLUT unit 16 stores a number of CLUT color values and the index values point at CLUT color values stored in the CLUT unit 16. For example, with 8-bit index values, the CLUT unit 16 may store up to 256 color values that can be pointed at by the index values. The CLUT color values are for example in YUV format, containing a field for describing the luminance component Y, and fields for describing color difference components U and V, each, for example, 8 bits long (the Y field representing natural (zero or positive) integers, the U,V fields arbitrary integers, i.e., negative, positive or zero). In response to an index value from the frame buffer 14, the CLUT unit 16 retrieves the CLUT color value pointed at by the index value and passes that CLUT color value to the output unit 18. The output unit 18 outputs output color values to the display unit 20 where they are shown at the appropriate pixel locations on a display screen.

The CLUT index determination unit 12 generally selects index values so that the difference between the original color values and the CLUT color values that correspond to the selected index values is minimal. In this way, an approximation of the source image is obtained that requires less storage space in the frame buffer than an image represented by the source color values. The index values should preferably point to the color value in the CLUT that is closest to the original color value. This may, for example, be realized using a search through the available color values in the CLUT. The search can make the determination of the index values computationally expensive. Therefore, the computational cost of the search may be reduced by a suitable choice of CLUT color values.

For example, if the original color is represented by RGB color components as produced by a computer graphics generator, one might ensure that the CLUT color values can be divided into groups, each associated with a respective R value, the R color component of all color values in a group being equal to the R value component associated with that group. In this case, one first searches for the group that has the closest R value with respect to the original color value and subsequently one searches through the group for the color value in that group whose GB color components are closest to those of the original color value. This latter search may be similarly simplified.

The output unit 18 treats the Y components of the CLUT color values on one hand and the UV components of the CLUT color values differently, so that the UV components output to the image display unit 20 have a lower sampling frequency.

Figure 2:
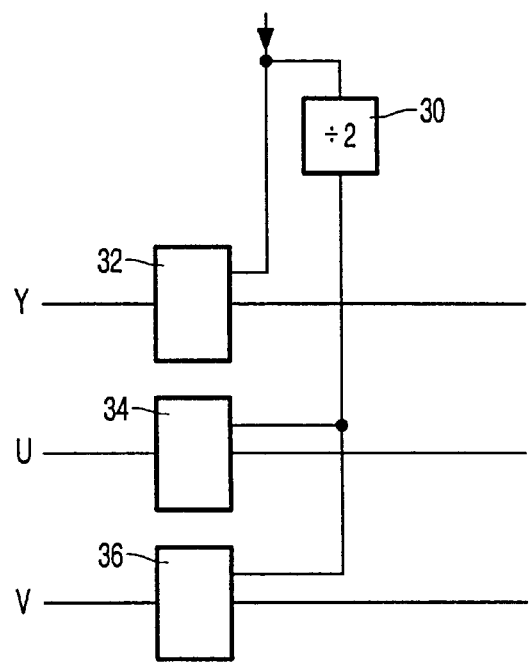
FIG. 2 shows an output unit.

FIG. 2 shows an example of an output unit that reduces the sampling frequency. The output unit contains three sampling registers 32, 34, 36 for the Y, U and V components of the color values, respectively. The output unit has a sampling clock input coupled to the sampling clock input of the sampling register 32 for the Y component. The sampling clock input is coupled to the sampling clock input of the sampling registers for the U and V components via a divide by two circuit 30.

In operation, the U and V values in the sampling registers 34, 36 will thus be refreshed at half the frequency at which the Y value in the sampling register 32 for the Y value is refreshed.

Different versions of the output unit 18, which reduce the sampling frequency of the UV components in a different way, are also conceivable. For example, the output unit 18 might output, each time, the average of the UV components of a pair of adjacent pixels. What these versions of the output unit 18 have in common is that certain variations in the UV components received from the CLUT unit 16 don't show up in the signal passed to the display unit 20. This is used in the determination of the index values in index determination unit 12.

Figure 3:
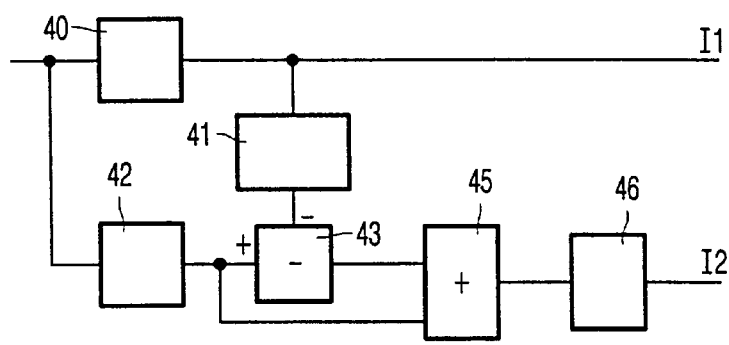
FIG. 3 shows a further CLUT index determination unit.

FIG. 3 shows an example of an index determination unit which makes use of the lower sampling frequency of the UV components as it occurs in the output unit of FIG. 2. The index determination unit of FIG. 3 has an input for source color values and index outputs for first and second index values I1, I2. The index value determination unit contains a color index determination unit 40 with an input coupled to the input for source color values and an output coupled to the index output for first index values I1. A further CLUT unit 41 has an input coupled to the index output for the first index values and an output coupled to a subtracting input of a subtractor 43. The input for source color values is coupled to a summing input of the subtractor 43 via a color-to-luminance (Y) converter 42. An output of the subtractor 43 is coupled to a first input of an adder 45 and an output of the color-to-luminance (Y) converter 42 is coupled to a second input of the adder 45. An output of the adder 45 is coupled to a Y index determination unit 46. An output of the Y index determination unit 46 is coupled to the output for the second index values I2.

In operation, the index determination unit determines a pair of a first and second index value I1, I2 that the output unit 18 will use for determining one set of UV components and two Y components. In the case of the output unit 18 of FIG. 2, the UV components of the first index value I1 will be loaded into the sampling register and the UV values of the second index value I2 will be lost.

The index value determination unit of FIG. 3 determines that index value I1 for which the difference between the YUV values of the index value in CLUT unit 16 and the YUV values corresponding to the source color value is substantially as small as possible as discernible to the algorithm used for selecting the index value (in general, this results in the nearest index value or not more than a few, say 5, percent more distant than the absolutely nearest). The index value determination unit of FIG. 3 determines the index value I2 so that the difference between the average of the Y components of the color values in the CLUT unit 16 pointed at by the index values I1 and I2 is substantially minimal among all possible second index values I2 given the algorithm used for selecting the index value. The error in the UV components of the color value pointed at by I2 is ignored, because this error will not be passed by the output unit 18 to display unit 20 and, therefore, will not cause any visible noise.

The latter selection generally results in a much more accurate Y value. For example, suppose 256 possible index values are uniformly distributed in color space. In that case, if one selects an index value that approximates the combination of YUV values that each run from 0–255 as closely as possible, the approximated Y value will, on average, have an error of something like 20. On the other hand, if an index value is selected that approximates only Y as closely as possible, no matter the error in U and V, the error will be only 1 or 2 on average.

In operation, the color index determination unit 40 determines a first index value I1 for CLUT unit 16 in any convenient manner. The first index value I1 is used as input to further CLUT unit 41, which outputs the luminance value Y corresponding to the entry for the index value I1 in the CLUT unit 18. This luminance value Y is subtracted from the luminance value Y associated with the source color value, to determine the luminance error caused by using the index value to represent the source color value. This error is added to the Y value of the color value and the result is used to select the second index value I2 pointing to the color values in CLUT unit 16. This selection is purely on the basis of the Y component of the color values in CLUT unit 16. In general, an index value I2 is selected which points to a color value whose Y is as close as possible to the result of adding the error to the Y value.

In other words, different kinds of index value determination criteria are used for the two pixels, one paying attention to all color components, the other only to luminance. The opposite of the error due to the determination of the index value for one pixel is transferred to the second pixel and compensated for according to the particular index determination criterium used for that pixel. This also avoids artifacts due to the different treatment of pixels in the output unit 18.

Of course, when an output unit 18 uses the YUV color values from the CLUT unit 16 in a different way, the selection of the index values I1, I2 is correspondingly modified, always so that arbitrarily large errors in the UV components occur only to the extent that these errors are not passed by the output unit 18. For example, if the output unit 18 passes the average of a pair of UV values, index values are selected so that the UV component of the source color value closely matches the average of the UV components of the CLUT color values in CLUT unit 16 pointed at by the index values I1, I2, whereas the difference between the UV values of these CLUT color values is allowed to take any value so long as the Y components of these CLUT color values closely match the Y component of the source color value and the average of the Y components of these CLUT color values matches the Y component of the source color value even more closely.

Similarly, if the output UV value is not an average, but the result of filtering a number of UV components, the UV components of some or all of the pixels involved in the filtering may be arbitrarily varied to the extent that the filtered and output UV components remain substantially the same.

Also, one might output the Y components from the lookup color values for all pixels, and the U and V components for even and odd pixels, respectively, i.e., alternately. In this case, one may select the index values for the even pixels so as to minimize an error in the Y and U components in the looked up values for the even pixels and select the index values for the odd pixels so as to minimize an error in the Y and V components in the looked up values for the odd pixels. In addition, preferably the color value used to determine one of the index values for a pair of an even pixel and a neighboring odd pixel may be modified so that the average Y component of the modified color value and the lookup value pointed at by the index value for the other pixel of the pair matches the average Y component of the source color values.

Furthermore, in FIG. 3, it was assumed that one source color value was used to determine the first and second index value. Of course one may also use two or more source color values. In this case, one may also use the properties of the output unit to get a better approximation of the Y values by allowing an arbitrary error in the UV components so far as this error is not passed by the output unit.

For example, suppose there are two source color values for two pixels locations corresponding to a first and second source color value respectively and that in the displayed image these pixel locations output the same UV components and different Y components. These UV and Y components are output by the output unit 18, the Y components being pointed at by a first and second index value I1, I2, respectively, the UV component being pointed at by the first index value I1. In this case one may determine the first index value I1 from the average of the first and second source color values plus a gray color correction in proportion to half the difference between the Y components corresponding to the first and the second color value. The second index value I2 may be determined to match the Y component corresponding to the second source color value with a correction equal to the error in the Y component introduced by the first index value. (Using colors represented by RGB and YUV, the gray correction is easily performed in RGB amounts by adding the same Y correction to all of the RGB components).

Instead of an index determination unit as shown in FIG. 3, the element that determines the index values may also be a suitably programmed general purpose computer. Readout from frame buffer 14 often needs to be performed at video sampling frequencies, but writing into the frame buffer 14 may be performed once for multiple video frames and can therefore be performed at a slower rate. As a result, the general purpose computer used for the determination of the index values does not need to be extremely fast. The following is an example of a program segment for determining the index values:

Pixel1Index=QuantiseRGB(Red, Green, Blue);
Y1=CLUTY[Pixel1Index];
Y2=(Red*77+Green*151+Blue*28)/128;
Pixel2Index=CLUTYlut[CLIP(Y2−Y1,0,255)];

This program segment computes two index values Pixel1Index and Pixel2Index for two pixels for which the output unit 18 outputs one pair of UV values and two Y values. In this program segment, the index Pixel1Index for a first pixel is determined from the Red, Green, and Blue components. Then the Y value Y1 corresponding to this index Pixel1Index according to the CLUT is determined, by looking up this Y value in a matrix called CLUTY. Subsequently the double (Y2) of the Y value corresponding to the original Red Green and Blue components is determined. The difference between this double Y2 and Y1 is clipped into the range 0–255 and used to lookup an index value Pixel2Index from a matrix CLUTYlut, which contains index values that best approximate various Y values. In practice, only the most significant bits of Y2−Y1 may be used, the matrix CLUTYlut containing even less than 256 index values. It has proved that this already gives satisfactory results.

In practice, the index values may be further improved by the use of dithering, using, for example, error diffusion techniques or dither matrices. This may be realized by adapting the image source 10, so that the source color values are appropriately modified.

Figure 4:
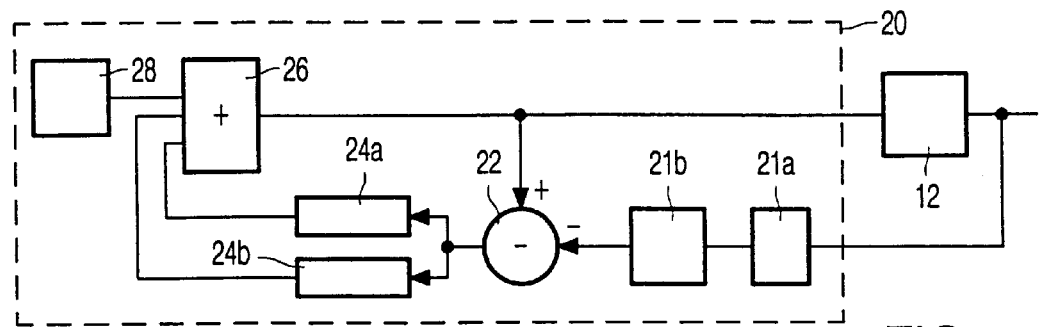
FIG. 4 shows a part of a further image display system.

FIG. 4 shows a part of an image display system containing a CLUT index determination unit 12 in combination with an image source adapted for producing error diffusion 20. The adapted image source 20 contains an original image source 28 which is coupled to the output of the adapted image source 20 via an adder 26. The output is coupled to the CLUT index determination unit 12. The adapted image source 20 has an input for receiving the index value from the CLUT index determination unit 12. This input is coupled to a CLUT unit 21*a*, which has an output coupled to a subtracting input of a subtractor 22 via an output unit 21*b*. A summing input of the subtractor 22 is coupled to the output of the image source 20. An output of the subtractor 22 is coupled to a first and second weighting/delay unit 24*a,b* which have outputs coupled to respective inputs of the adder 26.

In operation, the CLUT unit 21*a* and output unit 21*b* produce a reconstructed color value as generated by the CLUT unit 16 and the output unit 18 for each particular pair of pixels (that is, e.g., the corresponding to the U,V value of one of the pixels and the average of the Y values for the two pixels). The reconstructed color value is subtracted from the source color value output by the adapted image source 20 for the particular pixel. The result of subtraction is an error signal which is diffused among the pixels which neighbor the particular pixel. This is done by weighting the error and adding the weighted error to the original source color values produced by the original image source 28 for pixels which neighbor the particular pixel, for example, the pixels below and to the right of the particular pixels. Thus systematic errors with a low spatial frequency are suppressed.

The determination of index values using dithering can also be realized by a suitably programmed general purpose computer. The following is a program segment for determining the index values Pixel1Index and Pixel2Index for two pixels for which the output unit outputs one pair of UV values and two Y values with dithering of errors (the source color values are assumed to be the same for both pixels, with components Red, Green and Blue:

// add diffused error to target colors
  NewRed=Red+RedError;
  NewGreen=Green+GreenError;
  NewBlue=Blue+BlueError;
// determine first index value
  Pixel1Index=QuantiseRGB(NewRed, NewGreen, NewBlue);
// determine errors due to quantization by first index value
  RedError=NewRed-SystemColorsRed[Pixel1Index];
  GreenError=NewGreen-SystemColorsGreen[Pixel1Index];
  BlueError=NewBlue-SystemColorsBlue[Pixel1Index];
// determine second index value
  Y1=CLUTY[Pixel1];
  Y2=(NewRed*77+NewGreen*151+NewBlue*28)/128;
  Pixel2Index=CLUTYlut[CLIP(Y2-Y1,0,255)];
// update errors with Y error due to quantization by second index value
  Y=(CLUTY[Pixel2Index]-CLUTY[Pixel1Index])/2;
  RedError=RedError-Y;
  GreenError=GreenError-Y;
  BlueError=BlueError-Y;

It will be noted that the Y correction is added equally to the RGB errors. This makes the computation of the result efficient and is possible due to the definition of the RGB and YUV color representation standards.

What is claimed is:

1. An image display system comprising a cascade of an image source, an index determination element, a lookup table unit and an output unit, successively, the image source producing source color values, the index determination element selecting index values as a function of the source color values, the index values pointing to LUT color values stored in the lookup table unit, the output unit deriving output color values from LUT color values read from the lookup table unit under selection from the index values, each output color value corresponding to a pixel, a first component of the output color values being output in common for at least two pixels and a second component being output separately for each of these at least two pixels, whereby there is a space of possible combinations of index values for these at least two pixels, said combinations all resulting in substantially the same first component of the output color value, the index values in at least one combination from this space pointing to substantially different LUT color values, wherein the index determination element uses selection from this space to minimize an error in the second component of the output color values for the at least two pixels.

2. An image display system according to claim 1, wherein the index determination element first selects a set of combinations of index values which all give rise to a substantially accurate first and second component of the output color value for the at least two pixels, and then selects a combination from that set which substantially minimizes said error.

3. An image display system according to claim 1, wherein the first component is a color difference component U and/or V of a YUV color value, and the second component is a luminance component Y.

4. An image display system according to claim 2, wherein the first component is a color difference component U and/or V of a YUV color value, and the second component is a luminance component Y and the output unit takes the U and/or V component of the YUV value of one of the at least two pixels in common for all of the at least two pixels, the index determination element selecting the set by selecting an index value for that one of the at least two pixels, the index determination element selecting the combination by selection of an index value for a further one of the at least two pixels to minimize the error in the Y components for a combination of the at least two pixels.

5. An image display system according to claim 4, wherein the index determination element contains a table of index values addressable by Y component, each particular index value in the table pointing to LUT color values in the lookup table unit which substantially most closely approximates the Y value addressing that particular index value, the index value for the further one of the at least two pixels being selected by first selecting a Y value which would minimize said error and then looking up the index value for that Y value from the table of index values.

6. An image display system according to claim 1, wherein the source color values contain RGB components, the set being selected by first selecting a group of indices pointing at LUT color values, all having a same value for one of the RGB components, where the same value matches the corresponding component of the source color value, and subsequently selecting an index from the group.

7. An image display system according to claim 1, wherein the further YUV values are used as an overlay on a YUV image.

8. A device comprising an index determination element for selecting index values as a function of the source color values that point to LUT color values stored in a lookup table unit, the lookup table unit deriving output color values from LUT color values each output color value corresponding to a pixel, a first component of the output color values being output in common for at least two pixels, and a second component being output separately for each of these at least two pixels, whereby there is a space of possible combinations of index values for these at least two pixels, said combinations all resulting in substantially the same first component of the output color value, the index values in at least one combination from this space pointing to substantially different LUT color values, wherein the index determination element uses selection from this space to minimize an error in the second components of the output color values for the at least two pixels.

9. A method of selecting index values pointing to LUT color values in a lookup table used for deriving output color values from LUT color values, each output color value corresponding to a pixel, a first component of the output color values being output in common for at least two pixels and a second component being output separately for each of these at least two pixels, so that there is a space of possible combinations of index values for these at least two pixels which combinations all result in substantially the same first component of the output color value, the index values in at least one combination from this space pointing to substantially different LUT color values, the method comprising selection from this space to minimize an error in the second component of the output color values for the at least two pixels.

10. A machine readable medium comprising a computer program for determining index values according to the method of claim 9.

* * * * *